Dec. 15, 1959   E. WILDHABER   2,916,803
HOB
Filed June 8, 1954   3 Sheets-Sheet 1

INVENTOR:
E. WILDHABER
BY
Attorney

Dec. 15, 1959  E. WILDHABER  2,916,803
HOB

Filed June 8, 1954  3 Sheets-Sheet 2

INVENTOR:
E. WILDHABER
BY
Attorney

Dec. 15, 1959  E. WILDHABER  2,916,803
HOB
Filed June 8, 1954  3 Sheets-Sheet 3
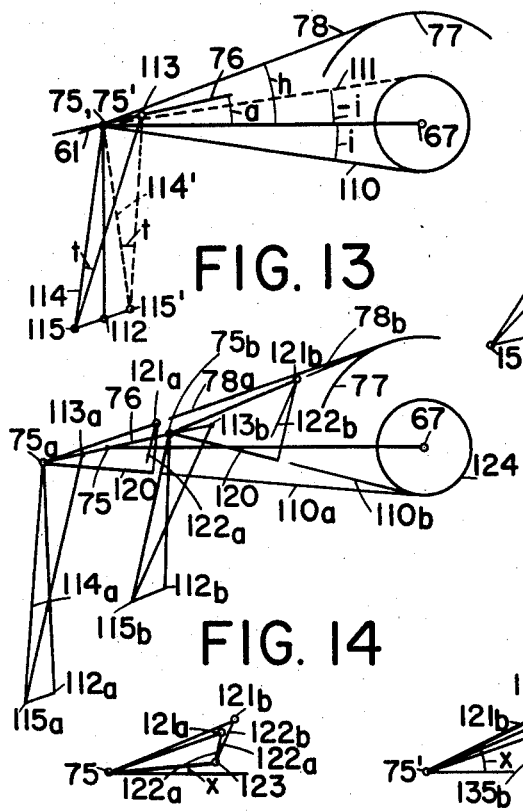
FIG. 13
FIG. 14
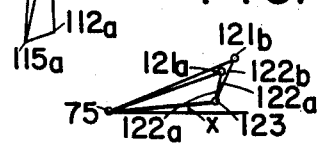
FIG. 15
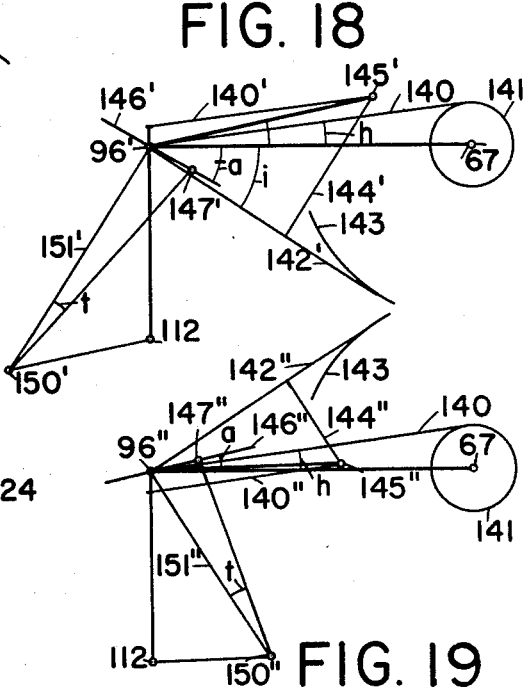
FIG. 18
FIG. 19
FIG. 17
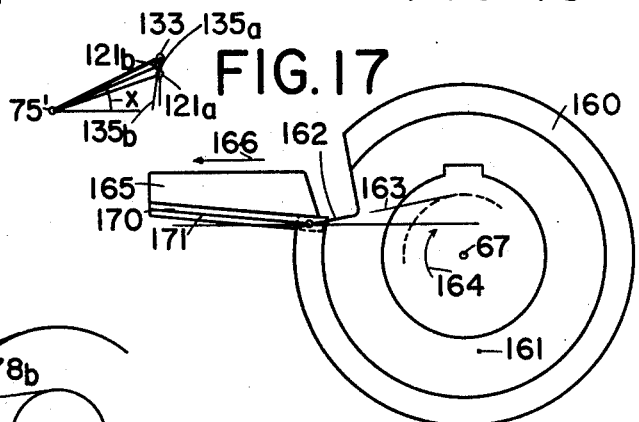
FIG. 20
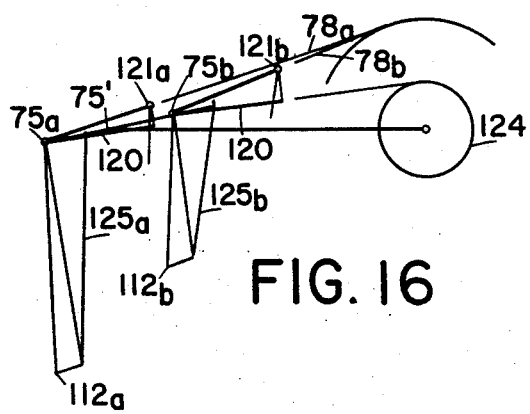
FIG. 16
INVENTOR:
E. WILDHABER
BY
Attorney United States Patent Office 2,916,803
Patented Dec. 15, 1959

2,916,803

HOB

Ernest Wildhaber, Brighton, N.Y.

Application June 8, 1954, Serial No. 435,260

12 Claims. (Cl. 29—103)

The present invention relates to cutting tools, and to methods of relieving such tools. More particularly it relates to hobs such as are used for generating spur, helical, and worm gears, and for cutting spline shafts, sprockets, and the like, and to methods of relieving such hobs.

Hobs are conventionally made by gashing a thread to provide cutting teeth and relieving the cutting teeth back of their front faces to provide the hob cutting edges. The cutting teeth are so disposed that their cutting edges lie in helical threads. As a hob is sharpened and resharpened, its diameter is gradually decreased. A hob should, of course, produce the same profile shape on the work being cut throughout the whole useful life of the hob. Conventional hobs do not fulfill this requirement exactly. They produce tooth profiles whose pressure angles vary to a small degree.

The conventional hob gashes have straight radial profiles in sections perpendicular to the hob axis and may either be straight or helical. With hobs of small lead angles, such as single thread hobs, and with conventional gashes, the pressure angle change during the life of the hob is small. In the case of helical gashes the gashes can be kept perpendicular to the hob thread at a given hob addendum to provide equal cutting angles on both sides of the hob teeth. Straight gashes are, however, simpler and can be formed exactly with less effort; but they result in an obtuse cutting angle on the one side of the hob teeth if the cutting faces are planes containing the hob axis.

It is known that such an obtuse cutting angle can be avoided by providing front rake or hook on the hob teeth so that the cutting face of a hob tooth is a plane offset from the hob axis and parallel thereto. The provision of front rake or hook, however, increases the change in pressure angle of the tooth profiles produced during the life of the hob and makes the pressure angle change much larger on one side than occurs where there is no front rake or hook.

One object of the present invention is to provide a hob which will produce a constant pressure angle throughout its life even though its diameter changes.

Another object of the invention is to provide a hob of moderate lead angle which can have straight gashes and front rake but without incurring errors of shape during the hob life.

A further object of the invention is to provide a hob whose pressure angle decreases during its life in such way that combined with decrease in its diameter it will produce a profile shape of constant pressure angle.

A further object of the invention is to provide a method for relieving such hobs.

Still another object of the invention is to provide a method for semi-finishing hobs.

A still further object of the invention is to provide a method for relieving hobs of the character described on conventional machines.

Other objects of the invention will be apparent hereinafter from the specification and from the recital of the appended claims.

In the drawings:

Figs. 1, 2 and 3 are diagrams illustrating the basic principles of the present invention and showing, respectively, axial sections of different hobs, each figure showing superimposed on one another two axial sections of the imaginary hob thread in which the cutting edges of the hob lie taken at different hob diameters, one showing the axial section when the hob is new and the other showing the axial section after the hob has been sharpened back considerably, the cross-hatching being omitted for clarity;

Fig. 13 is a diagram explanatory of some geometric relationships and problems incurred in relieving hobs with straight gashes according to the present invention;

Figs. 14 and 15 are diagrams for determining the relationships to be observed on one side of the hob teeth;

Figs. 16 and 17 are diagrams similar to Figures 14 and 15 but referring to the opposite side of the hob teeth;

Figs. 18 and 19 are diagrammatic axial views showing a geometric construction of the direction of the hob-cutting edge as required for making hobs with helical cutting faces in accordance with the present invention, these two figures relating, respectively, to opposite sides of the hob teeth; and Fig. 20 is a diagrammatic axial view illustrating an experimental determination of the shape of a relief cutting edge after its mean tangent has been determined.

A generating hob of the character referred to represents a helical pinion capable of contacting a toothed work piece as the hob is fed relative thereto across the face of the work, usually in the direction of the work axis. As the hob rotates in timed relation with the work and is fed, it describes the side surfaces of a moving rack; and the work piece is generated conjugate to said rack.

In the involute system of gearing the rack has plane sides and, as known, the theoretical hob thread in which the cutting edges lie, is fully conjugate to said rack and adapted to contact each of the plane sides of the rack along a straight line. This form of thread is known as an involute helicoid. It contains straight profiles in planes parallel to and offset from its axis.

Figure 1:
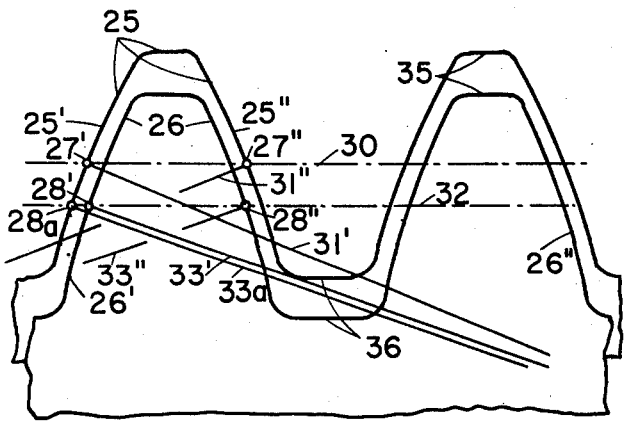

Fig. 1 shows superimposed on one another two partial axial sections of an involute helicoidal thread. The upper section 25 and the lower section 26 relate to the same hob. They are merely axial sections of the same thread at different diameters of the hob, as exist at different stages during the life of a hob. The side profiles 25', 25" of involute helicoid 25, and the side profiles 26', 26" of involute helicoid 26, are convex, the more convex, the larger the lead angle of the thread.

To clearly show up the properties, the thread illustrated corresponds to an ample lead angle, causing noticeably convex side profiles 25', 25", 26', 26". Points 27', 27" are mean profile points, which lie on a pitch line 30 parallel to the hob axis. They are points of opposite pitch helices of the thread. They correspond to mean profile points on the teeth of the work which may be pitch points. At the points of contact, the thread normals 31', 31" coincide with the tooth normals of the teeth of the work.

Since the hob thread and the work in the cutting operation turn at a constant ratio, and since their velocity component in the direction of the surface normal is equal at a point of contact, the thread and the work have the same pitch in the direction of the surface normal, that is, the same normal base pitch. Accordingly, if the points 28', 28" of the thread 26 of reduced diameter are to produce the same points on the work profile as the points 27', 27", they should have normals so directed that they also have the same normal base pitch. The points 28', 28" lie on a line 32 which approximately coincides with the position of pitch line 30 when the thread 26 is advanced radially to the position of mesh with the work.

This requirement of a constant normal base pitch at points 28', 28" as at points 27', 27", is automatically fulfilled on threads which are pure involute helicoids, for one of the characteristics of the involute helicoid is its constant normal base pitch at all of its points. On involute helicoids the threads 25 and 26 of the same lead and the same normal base pitch are of necessity identical threads. Profile 26' is identical with profile 25' and only displaced with respect to profile 25' in the direction of the thread axis and of pitch line 30. Likewise profile 26" is identical with profile 25" and merely displaced along the thread axis. The normal 33' at point 28' has the same inclination as the normal $33_a$ at point $28_a$ of profile 25', point $28a$ and point 28' having equal radial distances from the thread axis. Both normals 33' and $33_a$ are, however, inclined to normal 31' and define a decreased profile inclination or pressure angle. Likewise, normal 33" at point 28" is inclined to normal 31" at point 27", and defines a decreased pressure angle. These properties are known and are referred to here merely for better understanding of the present invention.

Preferably profiles 25 and 26 have the same tooth depth measured radially of the hob axis from the tops 35 to the respective bottoms 36.

Figure 2:
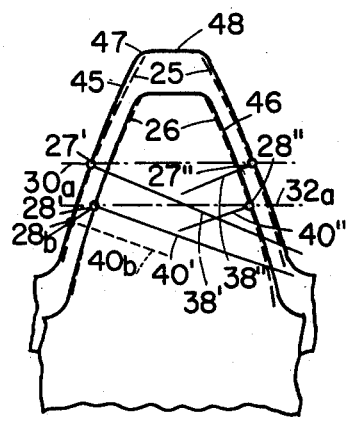

In the case of helical threads, such as shown in Fig. 2, that differ from exact involute helicoids, the requirement remains the same that the points 27', 28' have normals 38', 40', directed to result in the same normal base pitch at both points. Moreover, the points 27", 28" should have normals 38", 40" resulting in the same normal base pitch at both points. The points 27', 28', 27", 28" (Fig. 2) are the same as the points so denoted in Fig. 1; and the thread has the same lead as in Fig. 1. Normal 38' is identical with normal 31' of Fig. 1; and normal 38" is identical with normal 31". From the foregoing it follows that normals 40', 40" should be identical, respectively, with normals 33', 33" of Fig. 1, to obtain the same normal base pitch.

In Fig. 2 the side profiles of the involute helicoid are indicated in dotted lines 25, 26, while the actual side profiles 45, 46 for the two diameters of the hob are shown in full lines. These side profiles 45, 46 are tangent, respectively, to the side profiles of the involute helicoid at mean points 27', 27", 28', 28". They extend on the outside of the side profiles 25, 26 of the involute helicoid on both sides of the points of tangency; but the pressure angle of the thread 46 of smaller diameter at mean points 28', 28", is decreased exactly as on the involute helicoid. The pressure angle is understood to be the inclination of the surface normal to the pitch plane, that is, to a plane tangent to the cylindrical surface $32a$ passing through points 28', 28".

Thread profiles, such as indicated at 45, 46, exist on many worm gear hobs representing non-involute worms, also on hobs for generating involute gears with eased-off tooth profiles, and in other cases. Hobs are now generally designed to produce profile ease-off on the gear teeth, so that most gear generating hobs are in the class illustrated in Fig. 2.

When the profiles 25, 26 of the involute helicoids are noticeably convex, as shown, the profiles 45, 46 are less curved, that is, more nearly straight. It takes, therefore, an increased distance from the pitch line $30_a$ to a point $28_b$ where the profile normal $40_b$ is parallel to profile normal 40' at point 28'. If the cutting faces of a hob were axial planes a relieved side surface of a tooth of the hob should contain the profile corresponding to the particular side surface considered. In principle, this side surface can be obtained by moving a cutting edge 45, for instance, laterally and outwardly, so that, for instance, the point $28_b$ moves on the line $28_b$—28' inclined to the hob axis. This relieving motion would have to be superimposed on a relative helical motion between the tool and the hob blank, about and along the axis of the hob. It would produce a relieved surface which gives the required inclination of the cutting edges when intersected by cutting faces extending along axial planes.

More broadly, with either plane or helical cutting faces, a side surface of the relieved hob could be produced by a lateral and outward relieving motion of a cutting edge, which is the counterpart of the cutting edge of the hob. Again this motion would be superimposed on a relative helical motion about and along the hob axis. This process would produce the required decrease of pressure angle from front to back, so that the hob pressure angle decreases as the hob diameter decreases.

This possible method of relieving has drawbacks. The depth of the hob teeth changes from front to back, and has to be substantially larger at the front to have sufficient depth left at the back when the tool has been sharpened to its limit. The relieving tool then would have to have a point width narrow enough to clear the opposite side of the deep slot at the front. This weakens the tool, and also limits the length of the cutting teeth. In addition, the edge round 47 cannot be put on in the same operation, since the relieving tool does not move in the direction of the top edge. It is therefore more difficult to obtain a good blending between the side 45, or 46, and the edge round. Moreover, a separate operation is more costly. Furthermore, the tops 48 cannot be relieved together with the sides. For these reasons I prefer the method of relieving which is fully described hereinafter.

Figure 3:
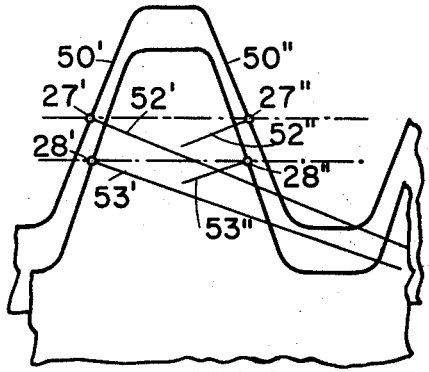

Fig. 3 shows two axial sections of hob threads of different diameters which have straight side profiles 50', 50". Here, the points 27', 28', 27", 28" are the same as the points denoted in Fig. 1 and the thread has the same lead as in Fig. 1. Normals 52', 52" are identical with normals 31' and 31", respectively; and the normals 53', 53" at the points 28', 28" should be identical with the normals 33', 33" of Fig. 1, respectively. Only in this way is it possible for points 27', 28', 27", 28" to produce the same profile inclination at the same points of the profiles of a toothed workpiece, with a hob of a given constant lead.

Figure 5:
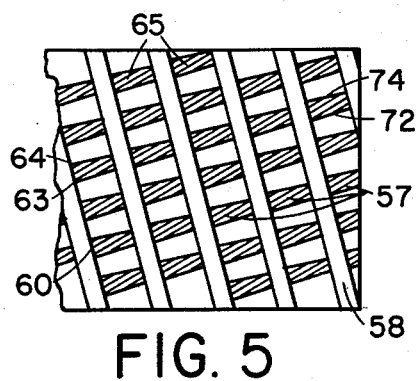
Fig. 5 is a partial development to a plane of the cylindrical pitch surface of a hob having multiple threads and helical gashes.
Figure 4:
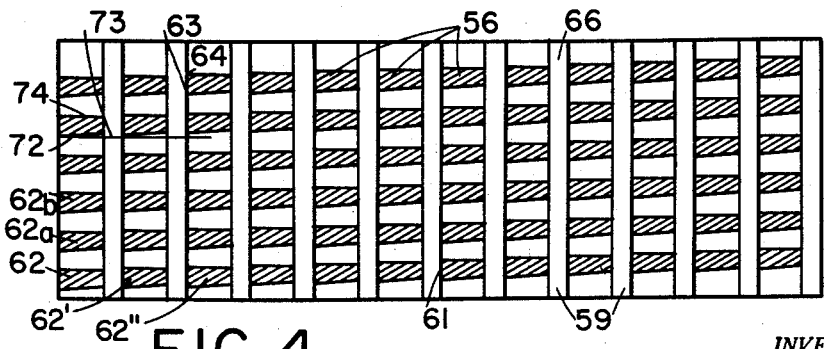
Fig. 4 is a development to a plane of the cylindrical pitch surface of a straight gashed hob near the start of the life of the hob.

Hobs constructed in accordance with the present invention may have a single thread 56 as shown in development in Fig. 4, or multiple threads 57 as indicated in Fig. 5. In the latter case, helical gashes 58 are preferably used, forming cutting faces 60. On single thread hobs (Fig. 4), and on some double thread hobs of moderate lead angle, straight gashes 59 with plane cutting faces 61 are preferably used, although helical gashes may be used if desired.

In all cases, the hob has a plurality of cutting teeth 62 (Fig. 4), 65 (Fig. 5) disposed side by side, like the teeth 62, 62a, 62b (Fig. 4), and also in line following each other, like the teeth 62, 62', 62''. Cutting edges 63, 64 are formed by the cutting faces 60 or 61 at the junctures of one side of the gashes and opposite sides of the thread. The cutting edges of the teeth 62, 62', 62'', which follow each other, lie in a helicoid of constant lead, in a helical thread referred to as the hob thread. The hob thread is a thread or tooth of a helical pinion capable of contacting with the teeth of the work. The hob represents a helical pinion, that is, a cylindrical pinion with one or more thread-like helical teeth. Ordinarily, but not necessarily, the hob teeth are alike.

Figures 6, 7:
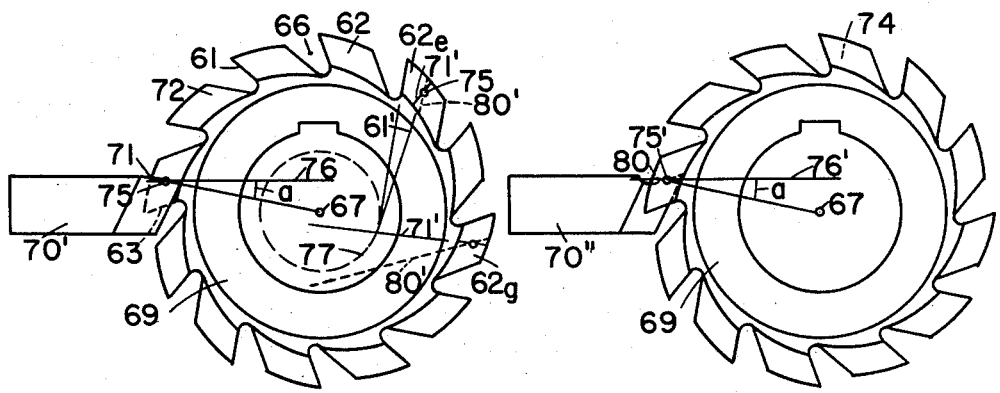
Fig. 6 is an end view of a hob which is gashed to have plane cutting faces, and showing a relieving tool in operative contact with one side of the hob teeth.
Fig. 7 is an end view of the hob shown in Fig. 6, illustrating the relieving tool in cutting contact with the opposite side of the hob teeth.

A preferred form of hob with a single thread, or at least a hob of moderate lead angle, is shown in an end view in Fig. 6. This hob has straight gashes 66 whose one side constitutes the cutting face 61. It is a plane parallel to and offset from the hob axis 67. The offset is in a direction to provide front rake, so that a keener cut is obtained.

Figure 8:
Fig. 8 is a front view of a plane cutting face of the hob of Figs. 6 and 7, showing how the cutting edges are differently curved at opposite sides of the hob teeth.

Fig. 8 is a view of a plane cutting face, and shows the cutting edges 63, 64. They are unequal, because of the offset of the gashes from the hob axis. Their inclination is different, so that the tooth profile leans somewhat. Furthermore, they are differently curved, edge 63 being more convex than edge 64. For simplicity, I have shown in Fig. 8 the basic cutting edges, the cutting edge of an exact involute helicoid without profile modification. The actual cutting edges for profile ease-off are as different on the two sides as these basic cutting edges and they are tangent to the basic cutting edges at their mean points.

If a relieving tool were used for relieving the hob which had a shape that was a counterpart of a cutting edge of the hob teeth, the two sides of the hob teeth would require relieving tools, having differently curved cutting edges. With the present invention relieving tools are used having straight cutting edges, and the relieving tools are positioned so that a hob is attained adapted to produce a suitable profile ease-off on each side of the teeth of the work. Moreover, the direction of the cutting edge of the relieving tool is so related to the direction of the relieving motion that the required decrease in pressure angle is obtained as the hob diameter is gradually decreased by sharpening.

The relieving motion is in the form of successive passes. It is preferably made along a straight line lying in a plane perpendicular to the hob axis. This motion is in addition to a relative helical motion between the relieving tool and the hob to be relieved, which is a timed motion along and about the hob axis.

Fig. 6 shows a relieving tool 70' with straight cutting edge 71 in cutting engagement with the relieved side 72 of a hob tooth 62. This is the side of the hob tooth with the cutting edge 63 (Fig. 4) which is more inclined to the peripheral direction 73 of the hob than the hob thread, and more inclined than the opposite side 74.

In the view of Fig. 6, the cutting edge 71 of the relieving tool appears inclined at an angle $x$ (not shown) to a radius 67—75 passing through a mean point 75 of the cutting edge. The relieving motion is horizontal, so that mean point 75 describes a straight line 76 which includes an angle $a$ with radius $r$, of the hob, where radius $r$ is the distance 67—75.

The cutting edge of the hob tooth itself lies in a plane cutting face 61, which is preferably kept at a constant offset from the hob axis during the entire life of the hob 69. When it passes through mean point 75, the hob cutting edge and the cutting face appear as a straight line 61' drawn through point 75 tangent to a cylindrical surface 77 whose radius equals the offset of the plane cutting face 61 from the hob axis 67.

Similar conditions exist on the opposite side 74 of the hob teeth illustrated in Fig. 7. The relieving tool 70'' has a straight cutting edge 80 which appears inclined at an angle $x$ (not shown) to radius 67—75', where 75' denotes a mean point of the cutting edge having the same distance $r$ from the hob axis 67 as mean point 75 of Fig. 6. Angle $x$ is numerically different from the angle between the radius and the projected cutting edge of the relieving tool on the opposite side (Fig. 6). The same symbol is used because the equations disclosed hereafter apply equally to both sides. The hob cutting edge passing through mean point 75' again lies in the plane cutting face 61 of the hob, and appears as a straight line offset from the hob axis 67 and omitted in this figure. The relieving motion is horizontal, so that mean point 75' travels on straight line 76', inclined at an angle $a$ from the radius $r$, which is here the distance 67—75'. In the embodiment illustrated in Figs. 6 to 9 the angle $a$ is the same on both sides of the hob teeth; but it does not necessarily have to be so.

The relieving motion is in a plane perpendicular to the hob axis 67, and in the above embodiment it is equally directed on both sides of the hob teeth, lines 76 and 76' being equally offset from the hob axis on the same side thereof. The relieving tools 70', 70'' for opposite sides may then be combined into a single tool 70, see Fig. 9, which contains the cutting edges 71, 80. These are provided on different teeth of the relieving tool, and engage opposite sides of different hob teeth 62, 62$_b$ and of different tooth spaces. The teeth 62, 62$_b$ are spaced teeth, that is, they are non-adjacent.

The cutting edges 71, 80 are askew to each other, that is, they are angularly disposed and offset from each other, as would be apparent if the tool 70'' of Fig. 7 were superimposed on the tool 70' of Fig. 6. Different cutting faces 85, 84 are provided for them, which are planes. With the disposition shown the cutting faces are prevented from interfering with each other, and are easily sharpened.

Figure 10:
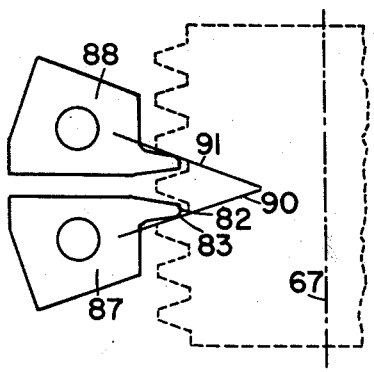
Fig. 10 is a plan view showing a pair of relieving tools in engagement with a hob, the hob being shown in outline, and illustrating a relieving method suited especially for semifinishing.

Fig. 10 illustrates a procedure preferably followed for semi-finishing hobs. After the unrelieved hob thread has been gashed, a pair of relieving tools 87, 88 are used which cut with their front ends only. Each has an end cutting edge 82 and an edge round 83 joining edge 82. The tools and the work perform a relative helical motion, which may be obtained by turning the work uniformly on its axis 67 and moving a tool carriage in the direction of said axis in a constant proportion to said turning motion; and in repeating this process after covering the whole length of the hob to be cut. In addition to this helical motion, the tool is preferably given a periodic uniform relieving motion in a plane perpendicular to the hob axis 67 at a rate of once for each hob tooth. Tool 87 is furthermore fed slowly in the direction of inclined line 90, either intermittently or uniformly, so that each time the length of the hob is covered, the tool has been slightly advanced along line 90. This line is therefore successively described by the tool; and the same shape can be produced as with a straight-edged side relieving tool, whose side-cutting edge is a portion of line 90.

Relieving tool 88 is similarly fed along line 91, and describes part of line 91.

Both tools can be used simultaneously when provision is made therefor on the relieving machine.

This process results in shorter and thicker chips than relieving processes where a side-cutting tool is used which cuts along its whole depth. The chip load is lighter for equal chip areas. Moreover, with the same chip load, or cutting force, larger chip areas can be tackled. It is, therefore, faster. It is applicable to all relieving processes of hobs with nearly straight cutting edges.

Figure 9:
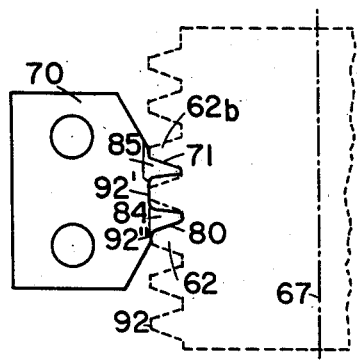
Fig. 9 is a more or less diagrammatic plan view showing a relieving tool combining the two tools of Figs. 6 and 7 and showing the hob outline in dotted lines.

The final finishing cut is preferably applied with a tool having cutting contact along the whole depth of the tooth, as by a tool 70, Fig. 9. The tooth tops 92 can be relieved in the same operation as the sides by a cutting edge 92' provided intermediate the cutting edges 71, 80. The edge rounds can also be applied to the hob teeth in the same operation by a concavely curved portion 92" joining a side cutting edge 71 or 80.

Even when the tooth tops of the hob are relieved in a separate operation from the sides of the hob teeth, at least the portion of the edge round immediately adjacent each side cutting edge of the hob is added during relieving of the adjacent side of the hob teeth, to obtain a smooth blend at the region where it is most important.

The present invention also applies to hobs which have projecting portions adjacent the tooth tops for extra relief at the tooth bottoms of the gears cut thereby. Such extra relief is used on gears intended to be shaved after hobbing.

Also, while I have shown relieving tools with individual cutting edges, it should be understood that I may also use grinding wheels for applying the final relieved shape. In this case some known modifications have to be made in the wheel profiles to produce a shape such as defined by tools with individual cutting edges.

Referring further to Figs. 6 and 7, and to the hob 69, the relieved side surfaces 72 and 74 are obtained as the relative path of straight cutting edges 71, 80. These surfaces are, therefore, composed of straight line elements 71', 80', best shown on hob teeth $62_e$ and $62_g$. These straight line elements, which are shown extended inwardly beyond the hob teeth, are offset from the hob axis 67, the straight line element 80' being more offset than 71', but both elements passing the hob axis on the same side. Hob tooth $62_e$ shows their comparison with the cutting face 61' passing through mean point 75. The two elements appear oppositely inclined to cutting face 61' and to the hob cutting edge.

Also, because of their inclination to the direction of the relieving motion 76, 76', the offset of the straight line elements from the hob axis changes on the hob teeth from front to back. The elements 71, 71' of side 72 are increasingly offset from front to back. The elements 80, 80' of side 74 have an offset decreasing from front to back. This is best seen in Fig. 7, where edge 80 can be visualized to be less offset in its inmost position than in the position shown.

Both sides of the hob teeth, furthermore, are so relieved that the hob pressure angle decreases from front to back, like the pressure angle of an exact involute helicoid.

Preferably the hob is sharpened in the same way throughout its life. Hob 69 then keeps its plane cutting face 61, which has a constant offset from the hob axis 67, during the entire life of the hob. The property of a decreasing pressure angle at a given hob addendum is then built into the relieved side surface of the hob teeth, as will further be described hereafter.

Figure 11:
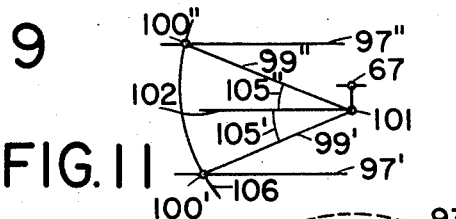
Fig. 11 is an auxiliary diagram.
Figure 12:
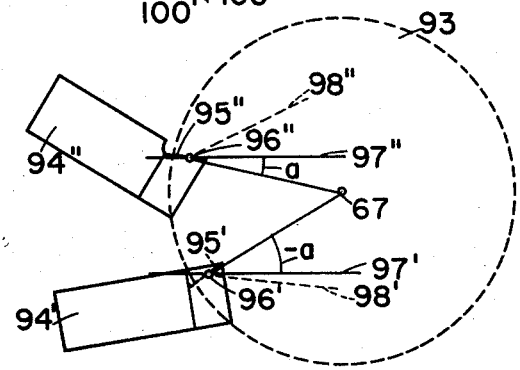
Fig. 12 is a diagrammatic end view along the hob axis and illustrating a pair of relieving tools for relieving opposite sides of the hob teeth in accordance with a modified method preferred on hobs with ample lead angles and constructed in accordance with the present invention.

Figs. 11 and 12 refer to an embodiment where the hob has a substantial lead angle. In such a case, helical gashes, such as shown at 58 in Fig. 5, are used, while with a moderate lead angle, either straight or helical gashes are feasible.

In Fig. 12, the hob 93 is indicated by its dotted outline only. Except for the helical gashes and the steeper threads it is similar to hob 69. The opposite sides of the hob teeth are then preferably relieved with differently directed relieving motions. This does not exclude simultaneous relieving of both sides of the hob teeth with a pair of relieving tools mounted on the same relieving slide. Tools 94' and 94" correspond to the tools 70' and 70", and operate on the front side and on the rear side respectively of a thread. The considered thread is a right-hand thread as are all the threads specifically illustrated, and is viewed from the side calling for counter-clockwise hob rotation. Right and left hand threads can be considered mere images of one another with respect to an axial plane; and the solution for one hand also provides the solution for the opposite hand.

Tool 94' with cutting edge 95' has a uniform relieving motion in a plane perpendicular to the hob axis 67, so that mean point 96' describes part of a straight line 97' in each relieving pass. Line 97' lies in said plane, and is offset from the hob axis 67. It includes an angle $a$ with radius 67—96', to be used with a negative sign in the equations hereinafter. The surface normal 98' of the continuous hob thread is also offset from the hob axis 67. It should be noted that the normal 98', as well as line 97', are offset in the same general direction from the hob axis; that is, they pass the hob axis on the same side. Tool 94" with cutting edge 95" has a uniform relieving motion such that its mean cutting point 96" describes part of a straight line 97". This line also lies in a plane perpendicular to the hob axis and is offset from the hob axis on the opposite side as compared with line 97'. It is offset on the same side as the surface normal 98" of the hob thread at mean point 96", and includes an angle $a$ with radius 67—96", to be used with a positive sign in the equations later.

In the illustrated case, the offsets of the relief paths 97', 97" are smaller than the offsets of the thread normals 98', 98", and their amounts of offset differ.

If both tools, 94', 94" are used together and are mounted on the same relieving slide, they should be positioned so that the relieving motion has the same direction with both tools, that their directions 97', 97" of relieving are parallel to each other, as shown. The tools are then positioned to operate simultaneously on spaced hob teeth facing different gashes and having different cutting faces. Also if both tools are used together, the same amount of relieving motion is used with both tools. Preferably the relieving motion is such as to produce the same direction of relief at the tops of the hob teeth, so that at least part of the edge round there can be carried by the side relieving tool.

To this effect, the positions of the two relieving paths 97', 97" should be related to each other as indicated in Fig. 11. The relief curves produced should be equally inclined to the peripheral direction on the two sides in an end view along the hob axis. That is, the normals 99', 99" of these curves at the mean points 100', 100" of the top surfaces should be equally offset from the hob axis 67. These normals are known to pass through an instantaneous axis 101 parallel to the hob axis and offset therefrom. Distance 67—101 depends upon the amount of relief. It can be considered the radius of a circle whose circumference is equal to the relieving distance traveled, if the relieving motion were to continue uniformly through a full turn of the work. The normals 99', 99" are equally offset from the hob axis 67, when they are equally inclined to a line 102 passing through instantaneous axis 101 and parallel to lines 97', 97" so that the angles 105' and 105" are equal.

Accordingly, when one of the two normals 99', 99" is assumed, the other normal is determined from the said requirement. The top points 100', 100" are determined as the intersection of the normals 99', 99" with a circle 106. This circle represents the cylindrical surface in which the outside cutting edges lie at an intermediate stage of the hob life. The different offsets from the hob axis 67 of the lines 97', 97" drawn through points 100', 100" are thus determined.

This relationship does not have to be observed when the two sides of the hob teeth are relieved in separate operations, and different relieving cams may be used on the two sides.

*Mathematical treatment*

Diagrams Figs. 13 to 17 inclusive relate to the hob shown in Figs. 6 to 10 inclusive having straight gashes, and are drawn at a larger scale. They represent views in the direction of the hob axis 67.

In the mean relieving position (Fig. 13) the plane cutting face 61 of a hob tooth, and the projected cutting edge at one side of this tooth appear as a straight line 78, and include an angle $h$ with the mean hob radius 67—75.

Point 75 of the relieving tool moves in a straight path 76 inclined from the hob radius $r$, which is distance 67—75, at an assumed angle $a$. This symbol also applies to the angle between the hob radius and the relieving path of the mean point 75' of the relieving tool operating on the opposite side, like tool 70'' of Fig. 7.

Fig. 13 also shows the projected surface normal 110 of the hob thread at mean point 75, and the projected surface normal 111 of the opposite side of the hob thread. The hob thread is understood to be the imaginary helical surface in which the cutting edges lie. The projected normals 110, 111 include an angle $i$ with radius $r$. Since the angles are opposite they are introduced in the equations hereinafter with positive and negative signs, respectively. These angles $i$ are computed from the specification of the hob.

The relieving tool moves at a given uniform rate along line 76 as the hob rotates uniformly. Thereby a point of the hob coinciding with point 75 moves in the direction 75—112 at right angles to radius $r$. This point has a peripheral velocity component in the drawing plane, and an axial component perpendicular thereto. Distance 75—113 describes the velocity of the relieving tool as compared with said velocity component of the hob in the drawing plane, which is described or measured by distance 75—112. The two distances are in the proportion of the relieving travel $c\theta$, and the peripheral travel $r\theta$ of point 75 of the hob, per turning angle $\theta$ of the hob in radian measure. $c$ is determined from the description of the relieving cam, and the number of gashes, in known manner. In cases where helical gashes are used, $c$ depends also on the lead of the gashes, as known.

The first step is to determine the tangent plane to the relieved tooth sides of the hob at mean point 75 or 75'. Particularly the trace of this tangent plane in the drawing plane will be determined. We know the tangent plane to the unrelieved hob thread in which the cutting edges lie. Its trace 114 is perpendicular to the projected surface normal 110. The two tangent planes intersect at the tangent to the cutting edge, which projects into line 78.

Draw line 112—115 through point 112 parallel to line 78 to determine its intersection 115 with known trace 114. The sought trace passes through point 75 and is parallel to the line connecting points 115 and 113.

For mathematical proof we consider an infinitesimal helical motion of the hob about its axis, and a corresponding displacement of the relieving tool. In this helical motion the tangent plane to the unrelieved hob thread remains undisturbed. That is, the plane with trace 114 is still a tangent plane. A point 75 moving with the hob moves on the helix tangent to a position 112 at an infinitesimal distance from original point 75. The tangent to the hob cutting edge is then in a position 112—115 and intersects the drawing plane at point 75. A point 115 moving with the relieving tool has reached a position 113 in that time. Points 115 and 113 are, therefore, points of the sought trace in the displaced position. Their connecting line is the trace in the infinitesimally displaced position; and the trace through point 75 is parallel to line 113—115.

The trace of the tangent plane to the opposite side of the relieved hob tooth is similarly constructed: Draw trace 114' at right angles to the projected surface normal 111; intersect it with line 112—115' parallel to 78 to determine point 115'. The sought trace is parallel to the connecting line 113—115'.

Diagram Fig. 14 refers to the same side 72 of the hob teeth as Fig. 6, the side of larger inclination to the peripheral direction than the unrelieved hob thread and than the opposite relieved side surface. Two relieving positions 75$a$, 75$b$ are considered. They are on opposite sides of the mean position 75 and equally spaced therefrom.

First the trace of the tangent plane of the relieved side surface is determined at the two points 75$a$, 75$b$ in the same way as described above for point 75. Thus, distance 75$a$—113$a$ on line 76 is equal to distance 75—113$b$. Trace 114$a$ is perpendicular to projected thread normal 110$a$. Line 75$a$—112$a$ is perpendicular to radius 67—75$a$ (connecting line omitted). Its length is larger than distance 75—112 of Fig. 13 in the proportion of radial distance 67—75$a$ to radius $r$, which is the distance 67—75. Line 112$a$—115$a$ is parallel to line 78$a$, which is tangent to the same circle 77 as line 78. The sought trace is parallel to the line 113$a$—115$a$.

The same procedure is followed at point 75$b$, where the sought trace is parallel to line 113$b$—115$b$. Distance 75$b$—112$b$ is here smaller than distance 75—112 in the proportion of radial distance 67—75$b$ to $r$, that is, the distance 67—75.

It has been pointed out that hobs constructed in accordance with the present invention should have pressure angles decreasing with decreasing hob diameters during the life of the hob, at a given constant hob addendum. This refers particularly to the pressure angle of the thread in which the cutting edges lie. Also, this pressure angle decrease should be same as exists on an involute helicoid which is tangent to the hob thread along a mean helix, so that at all points of a constant hob addendum the hob thread has the same normal base pitch.

Points 75$a$, 75, 75$b$ are mean points on the hob profile and have the same addendum at different stages during the hob life. At those points, then, the tangent plane of the unrelieved hob thread should be identical with the tangent plane of an involute helicoid tangent to the mean hob thread along a helix passing through point 75.

Accordingly, we plot a constant distance 120 from point 75$a$ on projected normal 110$a$, and the same distance 120 from point 75$b$ on projected normal 110$b$, and draw lines perpendicular to 110$a$ and 110$b$, respectively, through the end points thus obtained. These perpendiculars intersect lines 78$a$ and 78$b$ at points 121$a$ and 121$b$, respectively. These perpendiculars are parallel to the traces of the desired tangent planes, respectively, so that the elevation of points 121$a$, 121$b$ from the drawing plane is the same as at the end points of equal distances 120. In other words, the points 121$a$, 121$b$ have the same elevation from the drawing plane on hobs conforming to the present invention, because the tangent planes to the involute helicoid have a constant inclination to the drawing plane.

Points 121$a$, 121$b$ lie on the respective tangents to the hob cutting edge. Each tangent is also the intersection of the tangent planes to the unrelieved hob thread and the relieved side surface of a hob tooth. The lines 122$a$, 122$b$ of constant elevation from the drawing plane of the latter tangent planes are parallel to the respective traces 113$a$—115$a$ and 113$b$—115$b$.

Fig. 15 shows a combination of the results obtained for the two points 75$a$, 75$b$, which are moved together to coincide at 75. Line 75—121$a$ is parallel to line 78$a$ (Fig. 14) and is equal in length to distance 75$a$—121$a$. Line 75—121$b$ is parallel to line 78$b$ and equal in length to distance 75$b$—121$b$. The lines 122$a$, 122$b$ of constant elevation are parallel to the lines so denoted in Fig. 14. They intersect at point 123 at the same distance above the drawing plane as are points 121$a$, 121$b$. Line 75—123 is, therefore, the intersection line of the required tangent planes of the relieved side surface of the hob at the different radial distances of points 75$a$ and 75$b$. It satisfies the requirement at both points 75$a$ and 75$b$, and determines the required direction of the cutting edge of the relieving tool. If the cutting edge is curved, it is the direction of the tangent at the mean point. It includes an angle $x$ with the radial direction, in the view along the hob axis.

For each angle $a$ assumed for the direction of the relieving path in a plane perpendicular to the hob axis, within limits, there is an angle $x$ of the direction of the cutting edge, which lies also in the known tangent plane to the thread surface. Of the many possible solutions we pick the most practical one.

In the case of hobs of the type shown in Figs. 6 and 7 it is desirable to keep angle $a$ the same for both sides of the teeth, and to adopt the solution where a straight cutting edge on the relieving tool produces hob teeth adapted to give about the same amount of profile ease-off on the two sides. The amount of profile ease-off can be computed either as a problem of geometry, or it can be determined experimentally.

Fig. 16 refers to the opposite side of the relief surfaces, the side 74 referred to in Fig. 7, that is, the side of smaller inclination to the peripheral direction.

The procedure is analogous to the procedure described with reference to Fig. 14. Again the two points 75a, 75b of the relieving path 76 are considered. They are located on opposite sides of the mean point 75' and at equal distances therefrom. First, the direction of the relieved side surfaces of the hob teeth is determined, that is, the traces of their tangent planes at points 75a, 75b. In this construction, 75a—112a and 75b—112b are identical with the so denoted distances in Fig. 14 and parallel thereto. The sought traces are parallel to lines 125a, 125b. Then a constant distance 120 is plotted from points 75a, 75b on the projected normals tangent to circle 124, and lines are drawn perpendicular to said normals through the end points of distance 120. Thus points 121a, 121b are determined as the intersections of said perpendiculars with lines 78a, 78b, respectively.

Fig. 17 is similar to Fig. 15 and shows the combination of results obtained for the two points 75a, 75b. The lines 135a, 135b drawn through the points 121a, 121b of Fig. 17 parallel to 125a, 126b intersect at point 133. 75'—133 is the sought direction of the cutting edge of the relieving tool. Obviously, most accurate results can be obtained when the above construction is expressed in mathematical terms and computed.

Figs. 18 and 19 refer to a hob 93 (Fig. 12) having helical cutting faces, which contain straight lines in planes perpendicular to the hob axis 67. Fig. 18 refers to the side of increased inclination to the peripheral direction, like side 72 of Fig. 6 and the side on which tool 94' (Fig. 12) cuts. Fig. 19 refers to the opposite side, the side of decreased inclination to the peripheral direction. These figures show the determination of the tangent to the hob cutting edge and of the trace of the tangent plane to the relieved side surface of the hob teeth. The disposition shown is for a right hand hob viewed from the side which calls for a counter-clockwise rotation.

A plane perpendicular to the hob axis and passing through mean point 96', that is, the drawing plane, intersects the helical cutting face of the hob in a straight line 140, here shown offset from the hob axis 67 and tangent to a circle 141. This straight profile of the cutting face remains the same throughout the life of the hob. The construction is kept more general by using an offset line rather than a radial line, which is then obtainable as the case of zero offset. Line 140 includes an angle $h$ with radius $r$, which is here the distance 67—96'. The projected surface normal 142' to the unrelieved hob thread includes an angle $i$ with the radius $r$, and is tangent to a circle 143. On involute helicoids this circle is the base circle.

The tangent to the hob cutting edge at 96' is the intersection of the tangent plane of the unrelieved hob thread and of the helical cutting face. The trace of the tangent plane of the thread is perpendicular to the projected normal 142'. Thus, the tangent plane intersects a plane parallel to the drawing plane along a line 144'. The tangent plane of the helical cutting face intersects this same plane along a line 140' parallel to line 140. Lines 140' and 144' can be readily constructed for any given intersection plane, because these two tangent planes are known. Lines 140' and 144' intersect at a point 145' which lies on the sought tangent to the hob cutting edge. The latter appears as a line 96'—145'. From here on the determination of the trace in the drawing plane of the tangent plane to the relieved side surface of a hob tooth is the same as already described.

Point 147' on the relieving path 146' corresponds to point 113 of Fig. 13. Point 112 lies on the projected helix tangent 96'—112. As before, the distances 96'—147' and 96'—112 express simultaneous infinitesimal displacements, and are in the proportion of $c$ to $r$, as previously explained. Line 112—150' is parallel to the tangent 96'—145' of the hob cutting edge. It passes through point 112 and intersects the trace 151' of the tangent plane of the unrelieved hob thread at point 150'. This trace is perpendicular to the projected normal 142'. The sought trace is parallel to line 147'—150'.

Conditions are similar on the opposite side. In constructing the direction of the hob cutting edge at mean point 96" we again consider a plane parallel to the drawing plane, but now located below the drawing plane rather than above it. This plane intersects the tangent planes of the unrelieved hob thread and of the helical cutting face in lines 144" and 140", respectively, which intersect at a point 145". Line 144" is perpendicular to the projected normal 142" of the unrelieved hob thread, while line 140" is parallel to line 140. 96"—145" is the sought tangent of the hob cutting edge.

The direction 147"—150" of the sought trace of the tangent plane to the relieved side of a hob tooth is obtained by a construction analogous to the one described. 151" is perpendicular to the projected normal 142". Point 147" lies on the relieving path 146", which is inclined at an angle $a$ to the radius $r$, which is here the distance 67–96"; and line 112—150" is parallel to the tangent 96"—145" of the hob cutting edge. The remaining procedure is the same as already described with reference ot Figs. 14 and 16, except that in each position the direction of the hob cutting edge is determined as described above for the mean point. The direction of the cutting edge of the relieving tool is then obtained from diagrams like Figs. 15 and 17.

Within limits there is a solution for each assumed direction of the relieving path. That is, the tangent of the cutting edge of the relieving tool is determined for any given angle $a$ of the relieving path so that the hob conforms to the present invention, and has a pressure angle which decreases during its life at the required rate.

Ordinarily, the cutting edges of the hob and of the relieving tool are inclined to each other and cross one another. However, there is one solution where their directions coincide and the two edges have a common tangent. This solution can be found by interpolation. It may be used on hobs with ample lead angles, which call for curved relieving edges. In this case, the relieving edge can be made the counterpart of the hob cutting edge. The latter is obtained as the intersection of the desired unrelieved hob thread with the given cutting face. In this case, it will usually be necessary to relieve the two sides of the hob teeth in separate operations.

When the relieving edge is at an angle to the hob cutting edge, the shape of the relieving edge differs from that of the hob cutting edge and has to be determined either by computation or by an experimental procedure. Such a procedure will now be described with reference to Fig. 20. The unrelieved thread 160 is applied to a workpiece 161 with an axis 67. The diameter of this thread, in which the hob cutting edges are to lie, is made to correspond to an intermediate stage in the life of the hob. The counterpart 162 of a hob cutting face is then applied, so that its straight profile 163 has the same distance from the axis 67 as the profile of the hob cutting face. However, what is a positive hook or front rake on the hob appears as a negative hook on the piece 161. Its cutting edge is identical with the required hob cutting edge, since it is produced as the intersection of the same surface with the unrelieved hob thread.

Piece 161 is then imparted a turning motion on its axis 67 in the direction of arrow 164, while the relieving tool is represented by part 165, which is mounted on the relieving slide (not shown). There is also a lead motion effected between part 165 and piece 161 in accordance with the lead of the hob thread. Part 165 moves outwardly in the direction of the arrow 166 during the turning motion of piece 161 in the direction of arrow 164, and is constrained to do so by the same relieving cam as used on the hob. In other words, piece 161 and part 165 go through the relieving motion in reverse. This motion may be hand-operated and repeated.

Part 165 contains a pair of thin plates or templates 170 secured to it at its lower face, made of suitable material which can be cut freely. The pair of plates contact each other along a central plane which represents the cutting face of the relieving tool whose exact profile shape is to be determined, and whose direction or tangent has already been determined in the way described. In the said reverse relieving motion, the hob cutting edge of piece 161 will describe a surface on the pair of plates 170. Its intersection with the central plane 171 of the plates 170 is the sought cutting edge of the relieving tool. From there a duplicate is applied to the relieving tool.

A reversal of the relieving motion is used rather than the direct relieving motion so that interference with the unrelieved sides of the hob thread is avoided. The shape produced is the same. It is a direct generation of the relieving edge with the cutting edge of the unrelieved hob thread.

While I have described the procedure particularly for relieving tools with single cutting edges, it should be understood that I may also use grinding wheels instead of the relieving tools shown. In such case, the usual slight modification has to be made between cutting with an edge and grinding with a wheel.

*Equations*

In the described procedure, the direction of the relieving edge is determined from two relieving positions on opposite sides of the mean position and equally distant therefrom. The distances are preferably small enough to keep the considered points on the hob teeth, but otherwise may be assumed. Essentially, the same results are obtained regardless of the distance, within the specified limits. In the procedure now to be described, the distance of the considered points (75a, 75b in Figs. 14 and 16) from each other is assumed as infinitesimal.

The following equations may be derived by translating the above described steps to the use of infinitesimal distances.

In the equations, the following symbols are used:

$r$ is the mean hob radius.

$L$ is the lead of the hob thread.

$c$ is the relieving travel characteristic, as explained.

$\psi$ is the helix angle of the helical gash at radius $r$. $\psi$ is zero for straight gashes parallel to the hob axis.

$\lambda$ is the lead angle of the hob at the radius $r$.

$\varphi_n$ is the normal pressure angle of the hob at $r$. This is positive on the front side 72, and negative on the rear side 74. These sides correspond to hob relief surfaces of larger and smaller inclinations, respectively, to the peripheral direction.

$\lambda_b$ is the inclination of the mean tangent plane of the unrelieved thread surface to planes perpendicular to the hob axis.

$i$ is the inclination of the projected mean normal of the unrelieved thread surface from radius $r$, in a view along the hob axis.

$h$ is the inclination from the radius $r$ of the straight profile of a cutting face in a plane perpendicular to the hob axis.

$j$ is the inclination of the projected hob cutting edge from the projected normal to the hob thread, in a view along the hob axis.

$a$ is the inclination of the relieving path at the mean point to the hob radius $r$, and is positive or negative as explained.

$t$ is the relief angle, see Figs. 13, 18 and 19.

$x$ is the inclination of the mean tangent of the relieving edge to the hob radius $r$, in a view along the hob axis.

In the drawings, the various items are illustrated for right hand hobs looked at along the hob axis from the side which calls for counter-clockwise rotation on a right hand hob, and clockwise rotation on a left hand hob.

The quantities $\lambda$, $i$, $\lambda_b$, are determined from the following known equations:

$$\tan \lambda = \frac{L}{2\pi r}$$

$$\tan i = \frac{\sin \lambda}{\tan \varphi_n}$$

$\varphi_n$ being plus or minus as explained.

$$\tan \lambda_b = \frac{\tan \lambda}{\sin i} = \frac{\tan \varphi_n}{\cos \lambda \cos i}$$

From these known equations and from the considerations above, the following equations can be derived:

$$\text{Let } e = \tan \lambda_b \tan \psi \frac{\cos h}{\cos (h+i)} \qquad (1)$$

$$\text{Then } \tan j = \tan (h+i) + e \qquad (2)$$

$$\text{Let } A = \frac{\tan i + \tan h}{\cos^2 (h+i)}$$
$$- e[1 + \tan^2 h - \tan (h+i)\{\tan i + \tan h\}] \qquad (3)$$

$$\text{Let } Q = r \cos i[1 + \tan i \tan j] + c \sin (a+i) \qquad (4)$$

$$\text{Then: } \tan t = \frac{c \cos (a+i)}{Q} \qquad (5)$$

$$\text{Let } T = \sin t \cos t \left[\frac{r}{Q}\left(\frac{1}{\cos i} - A \sin i \tan j\right)\right.$$
$$\left. - (\tan i + \tan a)\{\tan (a+i) + \tan t\}\right] \qquad (6)$$

$$\text{Then: } \tan (i + t + x) = [\tan i + \tan a + T]$$
$$= \frac{(\tan j + \tan t)T + A \tan t}{(1 - \tan j \tan t)} \qquad (7)$$

The sought inclination $x$ is determined from the above Equation 7, and gives the solution for an assumed direction of the relieving path, with angle $a$, and with a given relief constant $c$.

These equations are simplified in special cases. Thus, when the cutting face has a straight radial profile in a plane perpendicular to the hob axis, the angle $h$ is zero. Equations 1, 2, and 3 then become, respectively:

$$e = \frac{\tan \lambda_b \tan \psi}{\cos i} \qquad (1a)$$

$$\tan j = \tan i + e \qquad (2a)$$

$$A = \frac{\tan i}{\cos^2 i} - e(1 - \tan^2 i) \qquad (3a)$$

The two opposite sides have then numerically equal quantities $e$, $\tan j$, $A$, with opposite algebraic signs.

The use of straight gashes constitutes another special case. Then Equations 1, 2, and 3 become, respectively:

$$e = 0 \quad (1b)$$

$$\tan j = \tan (h+i) \ ; \ j = (h+i) \quad (2b)$$

$$A = \frac{\tan i + \tan h}{\cos^2 (h+i)} \quad (3b)$$

Thereafter Equations 4 to 7 may be used.

These various equations afford a relatively simple computation of the problems involved.

The computations of hobs with left hand threads may be made as if for right hand threads, and the solutions are then interpreted in known manner to apply to the mirror image of the right hand hob, which is the left hand hob.

While the invention has been described in connection with several different embodiments thereof, it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A hob having a helical thread of constant lead gashed to provide a plurality of cutting teeth spaced from one another both axially and circumferentially of the hob, said teeth having side cutting edges formed at the junctures of the front faces of the teeth and the sides thereof, the side cutting edges at corresponding sides of the teeth being arranged in a helicoid whose axial profile differs from the axial profile of an involute helicoid that is tangent thereto along a mean helix, the axial profile of the first-named helicoid extending on both sides of the hob thread outside the axial profile of said involute helicoid on both sides of the point of tangency of the two helicoids, and the side of each of said corresponding sides of the teeth having a pressure angle so decreasing from front to rear as to provide a constant normal base pitch at all hob diameters during the life of the hob as the hob decreases in diameter due to sharpening.

2. A hob having a helical thread of constant lead gashed to provide a plurality of cutting teeth spaced from one another both axially and circumferentially of the hob, said cutting teeth having front faces formed by one side of the gashes and said cutting teeth having sides and tops, the intersections of said sides and tops with said front faces forming cutting edges, said teeth being relieved back of said cutting edges, corresponding side cutting edges lying in a helicoid of constant lead but the relieved side surfaces of the teeth back of the side cutting edges differing from helical surfaces of constant lead and having pressure angles decreasing from front to rear at a given mean cutting depth so as to provide a constant normal base pitch from front to rear at said depth.

3. A hob having a plurality of identical cutting teeth spaced from one another both axially and circumferentially of the hob and arranged in a thread which is inclined to the hob periphery, each of said cutting teeth having a front face which lies in a plane parallel to and offset from the hob axis, said teeth having side surfaces and having side cutting edges formed at the junctures of said side surfaces and said front faces, said side surfaces being relieved back of said front faces, the relieved side surfaces of said teeth differing from exact helical surfaces of constant lead and being composed of straight-line elements, said relieved side surfaces decreasing in pressure angle from front to rear so as to provide a constant normal base pitch at a given constant addendum regardless of change in hob diameter with sharpening.

4. A rotary hob having a plurality of identical cutting teeth spaced from one another both axially and circumferentially of the hob and arranged in a thread inclined to the hob periphery, said cutting teeth having front and side surfaces and having side cutting edges formed at the junctures of the front and side surfaces, the side surfaces being relieved back of said side cutting edges, the relieved side surfaces of said cutting teeth differing from exact helical surfaces of constant lead and being composed of straight-line elements, the straight-line elements of opposite sides of a cutting tooth, when extended, passing the hob axis on the same side but at different distances therefrom.

5. A rotary hob having a plurality of identical cutting teeth spaced from one another both axially and circumferentially of the hob and arranged in a thread inclined to the hob periphery, said cutting teeth having front and side surfaces and having side cutting edges formed at the junctures of the front and side surfaces, corresponding side cutting edges of the teeth lying in a thread, the opposite side surfaces of a cutting tooth being relieved back of its side cutting edges and being more inclined and less inclined, respectively, to the peripheral direction than the thread in which the side cutting edges lie, the side surfaces of less inclination being composed of straight line elements whose distance from the hob axis decreases from front to rear of a tooth.

6. A rotary hob having a plurality of identical cutting teeth spaced from one another both axially and circumferentially of the hob and arranged in a thread inclined to the hob periphery, said cutting teeth having front and side surfaces and having side cutting edges formed at the junctures of the front and side surfaces, the front faces of said cutting teeth being planes parallel to and offset from the hob axis, corresponding side cutting edges of the teeth lying in a thread, the two opposite side surfaces of a cutting tooth being relieved back of its side cutting edges and being more inclined and less inclined, respectively, to the peripheral direction than the thread in which the respective cutting edges lie, both said side surfaces being composed of straight-line elements whose distance from the hob axis changes from front to rear of a tooth, the elements of the side surface of smaller inclination having a larger distance from the hob axis than the elements of the opposite side surface.

7. A rotary hob having a plurality of identical cutting teeth spaced from one another both axially and circumferentially of the hob and arranged in a thread inclined to the hob periphery, said cutting teeth having front and side surfaces and having side cutting edges formed at the junctures of the front and side surfaces, the two opposite side surfaces of a cutting tooth being relieved back of the front face of the tooth and differing from exact helicoids of constant lead, the inclination of said side surfaces to radii perpendicular to the hob axis decreasing from front to rear of the hob tooth at a given constant hob addendum.

8. A rotary hob having a plurality of cutting teeth arranged in a helical thread of uniform lead, said teeth having front faces and side surfaces and having side cutting edges at the junctures of said front faces and side surfaces, said side surfaces being relieved inwardly back of said front faces so that the depth of said teeth is approximately constant from front to rear within the life range of said teeth, the side cutting edges of each of the two opposite sides of the hob thread lying in a helicoid, said helicoid differing from an involute helicoid which is of the same lead and of the same mean profile inclination at least adjacent one end of the side cutting edges, and the first-named helicoid extending outside said involute helicoid adjacent said one end, said side surfaces being shaped to provide the same profile inclination of the hob thread as contained on said involute helicoid, midway between top and bottom of said thread, from front to rear of said cutting teeth within their life range.

9. A hob according to claim 8, wherein the profile inclination of the relieved side surfaces is different on opposite sides of the hob thread.

10. A hob according to claim 8, wherein the helicoid containing the side cutting edges of one side of the hob thread and the involute helicoid have different profile curvatures and are tangent to each other at a depth intermediate the outer and inner ends of the thread depth.

11. A hob having a helical thread of constant lead gashed to provide a plurality of cutting teeth spaced from one another both axially and circumferentially of the hob, said cutting teeth having front faces formed by one side of the gashes and said teeth having sides and tops, the intersections of said sides and tops with said front faces forming cutting edges, said sides and tops and the bottoms of the spaces between said teeth being relieved back of said gashes so as to extend at a distance from the hob axis decreasing with increasing distance from said front faces, one side of said hob teeth at least having a profile inclination so decreasing from front to rear that at the points intermediate the top and bottom of said side surface, which are at a constant distance from said top, the cutting edge is always perpendicular to the normal of an involute helicoid having the lead of the continuous thread that contains the cutting edges of that side.

12. A hob according to the preceding claim, having a plurality of threads, each thread constituted by a plurality of cutting teeth, and having helical gashes to form cutting faces and cutting edges on said teeth.

References Cited in the file of this patent
UNITED STATES PATENTS

| | | |
|---|---|---|
| 697,875 | Panse | Apr. 15, 1902 |
| 1,003,130 | Zimmermann | Sept. 13, 1911 |
| 1,079,420 | McKay | Nov. 25, 1913 |
| 1,348,304 | Muller | Aug. 3, 1920 |
| 1,571,359 | Wildhaber | Feb. 2, 1926 |
| 1,763,983 | Olson | June 17, 1930 |
| 1,847,054 | Breuer | Feb. 23, 1932 |
| 1,863,512 | Trbojevich | June 14, 1932 |
| 2,015,068 | Edgar | Sept. 24, 1935 |
| 2,112,455 | Edgar | Mar. 29, 1938 |
| 2,246,503 | Carlsen | June 24, 1941 |
| 2,304,586 | Miller | Dec. 8, 1942 |
| 2,338,366 | Trbojevich | Jan. 4, 1944 |
| 2,511,964 | Boor | June 20, 1950 |
| 2,698,477 | Jarno | Jan. 5, 1955 |